(12) United States Patent
Singh et al.

(10) Patent No.: US 12,634,722 B2
(45) Date of Patent: May 19, 2026

(54) RESILIENCY AGAINST NRF FAILURE IN A 5G NETWORK

(71) Applicant: Oracle International Corporation, Redwood City, CA (US)

(72) Inventors: Virendra Singh, Bengaluru (IN); Jeffrey Alan Craig, Hillsborough, NC (US); Jay Rajput, Bengaluru (IN); Ankit Srivastava, Bengaluru (IN); Amarnath Jayaramachar, Bengaluru (IN)

(73) Assignee: Oracle International Corporation, Redwood City, CA (US)

( * ) Notice: Subject to any disclaimer, the term of this patent is extended or adjusted under 35 U.S.C. 154(b) by 322 days.

(21) Appl. No.: 18/410,747

(22) Filed: Jan. 11, 2024

(65) Prior Publication Data

US 2025/0234217 A1     Jul. 17, 2025

(51) Int. Cl.
  *H04W 24/04*     (2009.01)
  *H04W 24/08*     (2009.01)
  *H04W 40/24*     (2009.01)
(52) U.S. Cl.
  CPC .......... *H04W 24/04* (2013.01); *H04W 24/08* (2013.01); *H04W 40/248* (2013.01)
(58) Field of Classification Search
  None
  See application file for complete search history.

(56) References Cited

U.S. PATENT DOCUMENTS

| | | | | | |
|---|---|---|---|---|---|
| 2020/0404069 | A1* | 12/2020 | Li | ........................... | H04L 67/59 |
| 2020/0404608 | A1* | 12/2020 | Albasheir | ............. | H04W 48/18 |
| 2021/0021494 | A1* | 1/2021 | Yao | ..................... | H04L 41/0631 |
| 2021/0022182 | A1* | 1/2021 | Mondal | ............... | H04W 56/001 |
| 2021/0029731 | A1* | 1/2021 | Kundu | ................ | H04W 74/004 |
| 2021/0058784 | A1* | 2/2021 | Kedalagudde | ........ | H04W 76/12 |
| 2021/0075631 | A1* | 3/2021 | Liao | .................. | H04M 15/8038 |
| 2021/0112012 | A1* | 4/2021 | Krishan | .................. | H04L 47/29 |
| 2021/0112443 | A1* | 4/2021 | Krishan | ............. | H04L 12/1407 |
| 2021/0306326 | A1* | 9/2021 | Bykampadi | ............. | H04L 63/12 |

(Continued)

OTHER PUBLICATIONS

3rd Generation Partnership Project; Technical Specification Group Core Network and Terminals; 5G System; Network Function Repository Services; Stage 3 (Release 18), 3GPP TS 29.510 V18.5.0, Jan. 2, 2024, 382 pages.

(Continued)

*Primary Examiner* — Faiyazkhan Ghafoerkhan

(57) ABSTRACT

The technology disclosed herein enables resiliency of routing between NFs when degraded 5G NF topology information is provided to an SCP by an NRF. In a particular example, a method includes transmitting requests for NRF status from a Service Communications Proxy (SCP) to NRFs in a 5G network. The NRFs exchange messages with each other to determine whether Network Function (NF) topology information is available from the NRFs. The method further includes receiving responses to the requests in the SCP. The responses indicate a number of the NRFs from which the NF topology information is available. The method also includes identifying one or more failed NRFs of the NRFs that are in a failed state based on the responses. The NF topology information is aggregated from operative NRFs should one or more of the NRFs still be operative.

20 Claims, 7 Drawing Sheets

(56)           References Cited

U.S. PATENT DOCUMENTS

| | | | | |
|---|---|---|---|---|
| 2022/0022023 A1* | 1/2022 | Zong | H04W 8/02 | |
| 2022/0022040 A1* | 1/2022 | Mahalank | H04W 12/08 | |
| 2022/0038545 A1* | 2/2022 | Krishan | H04L 67/1014 | |
| 2022/0052992 A1* | 2/2022 | Zhang | H04W 12/06 | |
| 2022/0159536 A1* | 5/2022 | Sama | H04W 36/18 | |
| 2022/0330085 A1* | 10/2022 | Li | H04W 28/10 | |
| 2022/0345379 A1* | 10/2022 | Li | H04L 67/561 | |
| 2022/0393971 A1* | 12/2022 | Bartolome Rodrigo | H04L 45/02 | |
| 2023/0156509 A1* | 5/2023 | Bolotin | H04W 24/08 | 370/329 |
| 2023/0163984 A1* | 5/2023 | Shan | H04M 15/66 | 370/259 |
| 2023/0199595 A1* | 6/2023 | Lu | H04W 36/12 | 370/329 |
| 2023/0284292 A1* | 9/2023 | Hellgren | H04L 41/0803 | 370/329 |
| 2024/0015569 A1* | 1/2024 | Doostnejad | H04L 47/24 | |
| 2025/0220687 A1* | 7/2025 | Talarico | H04L 5/0094 | |
| 2025/0220753 A1* | 7/2025 | Li | H04W 76/18 | |
| 2025/0227469 A1* | 7/2025 | Shekhar | H04W 12/08 | |
| 2025/0234217 A1* | 7/2025 | Singh | H04W 40/248 | |

OTHER PUBLICATIONS

Extended European Search Report for EP Application No. 25151102. 8, mailed May 23, 2025, 11 pages.
Nokia et al, "NRF Set support" 3GPP Draft; C4-221540, 3rd Generation Partnership Project (3GPP), vol. CT WG4, Release: Rel-17, Feb. 10, 2022, 11 pages.

* cited by examiner

TRANSMIT REQUESTS FOR NRF STATUS FROM NRFS 111-113 201

RECEIVE RESPONSES INDICATING A NUMBER OF NRFS WITH TOPOLOGY INFORMATION AVAILABLE 202

ALL AVAILABLE? 203

YES

NO

AGGREGATE TOPOLOGY INFORMATION FROM AVAILABLE NRFS 204

200

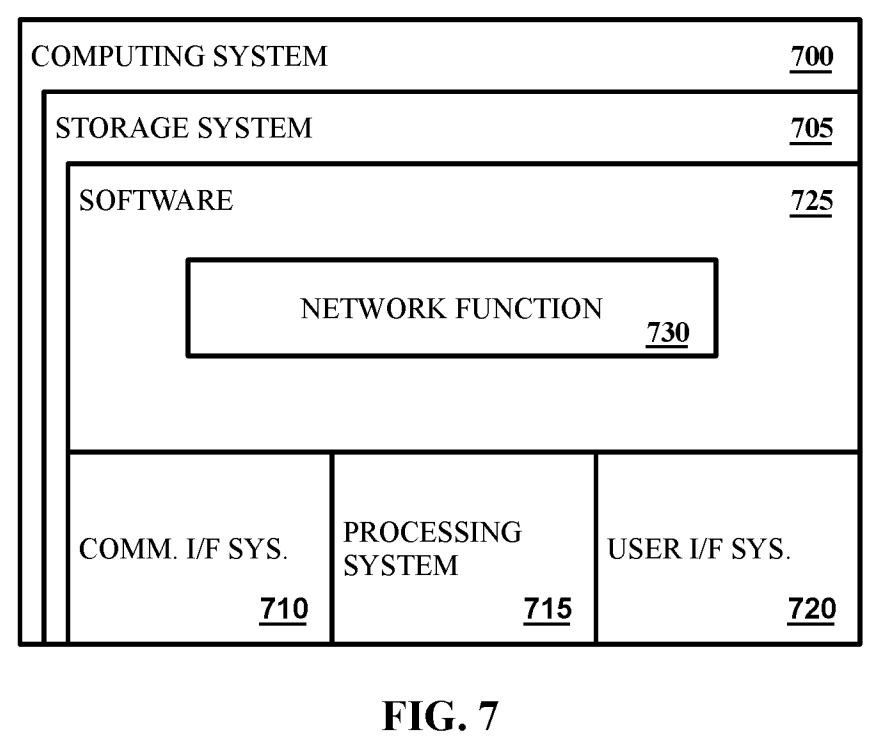

COMPUTING SYSTEM 700

STORAGE SYSTEM 705

SOFTWARE 725

NETWORK FUNCTION 730

COMM. I/F SYS. 710

PROCESSING SYSTEM 715

USER I/F SYS. 720

FIG. 7

RESILIENCY AGAINST NRF FAILURE IN A 5G NETWORK

BACKGROUND

In Fifth Generation (5G) networks, the 3GPP Release 16 (R16) defines the Service Communication Proxy (SCP) as a key component for indirect communication models C and D within the 5G Service-Based Interface (SBI). The SCP acts as an intermediary, routing service requests between network functions (NFs) to enable efficient and secure communication. To fulfill its routing responsibilities, the SCP relies on information about available NF instances and their supported services. This information is maintained by the Network Function Repository Function (NRF), which acts as a central registry for NF profiles within the 5G core network (5GC).

To maintain an accurate understanding of the 5G NF topology, the SCP employs two primary mechanisms, NF status change notification and periodic topology audits. For NF status change notifications, the SCP subscribes to notifications from the NRF regarding any changes in NF status, such as NF instances becoming available or unavailable. This allows the SCP to dynamically update its topology information in real-time. The SCP also conducts periodic audits of the 5G NF topology by directly querying the NRF. This serves as a mechanism to verify and reconcile any potential discrepancies between the SCP's current topology knowledge and the information maintained by the NRF.

Despite these measures, a potential vulnerability exists in current 3GPP standards regarding the handling of NRF failures. Specifically, in scenarios where an NRF instance or an entire NRF-set fails, the NRF may still provide a success response to the SCP, even with incomplete or empty 5G NF topology data. This can lead to several critical issues. When receiving incomplete topology information, the SCP may operate with a limited or inaccurate view of the network topology, potentially resulting in routing failures or service outages. The 3GPP standards currently lack mechanisms for the NRF to explicitly communicate its degraded state to the SCP, further hindering awareness and mitigation efforts.

SUMMARY

The technology disclosed herein enables resiliency of routing between NFs when degraded 5G NF topology information is provided to an SCP by an NRF. In a particular example, a method includes transmitting requests for NRF status from a Service Communications Proxy (SCP) to NRFs in a 5G network. The NRFs exchange messages with each other to determine whether Network Function (NF) topology information is available from the NRFs. The method further includes receiving responses to the requests in the SCP. The responses indicate a number of the NRFs from which the NF topology information is available. The method also includes identifying one or more failed NRFs of the NRFs that are in a failed state based on the responses. The NF topology information is aggregated from operative NRFs should one or more of the NRFs still be operative.

In other examples, an apparatus performs the above-recited method and program instructions stored on computer readable storage media direct a processing system to perform the above-recited method.

BRIEF DESCRIPTION OF THE DRAWINGS

FIG. 7 illustrates a computing system for providing resiliency against NRF failure in a 5G network.

DETAILED DESCRIPTION

When any specific NRF within a NRF set is unable to provide the complete network view (e.g., due to a database failure at the NRF), the NRF may still provide a response to an SCP with whatever degraded 5G NF topology information is available to the NRF. Due to the response, the SCP remains unaware of the degraded operating status of the NRF and, therefore, does not contact other NRFs in the NRF set to try obtaining better 5G NF topology information (i.e., 5G NF topology information that is less degraded or not degraded). The SCPs and NRFs described below provide mechanisms for obtaining 5G NF topology information from other NRFs to detect and account for the degraded 5G NF topology information. Moreover, the mechanisms enable an SCP to account for all NRFs in an NRF set providing degraded 5G NF topology information or no 5G NF topology information at all.

In an example, a mechanism enhances an NRF to provide the 5G NF topology availability info to the SCP (and its consumer NF) to determine the NRF instance or NRF-set failure. In another example, the SCP learns the 5G NF topology from all NRF instances of the NRF-set and aggregates the learned 5G NF topology information for routing. The SCP may also extend the validity of delegated NF discovery response caches to continue 5G SBI request routing using the learned 5G NF topology and extended cached discovery response. The SCP may further optimize discovery service request processing using learned 5G NF topology and static NF topology configuration. Also, the SCP may use cached access tokens (e.g., an Oauth2 token) with an extended expiry time (acquired from NRF as per static 5G SBI authorization policy configuration at SCP) when the NRF set fails.

Figure 1:
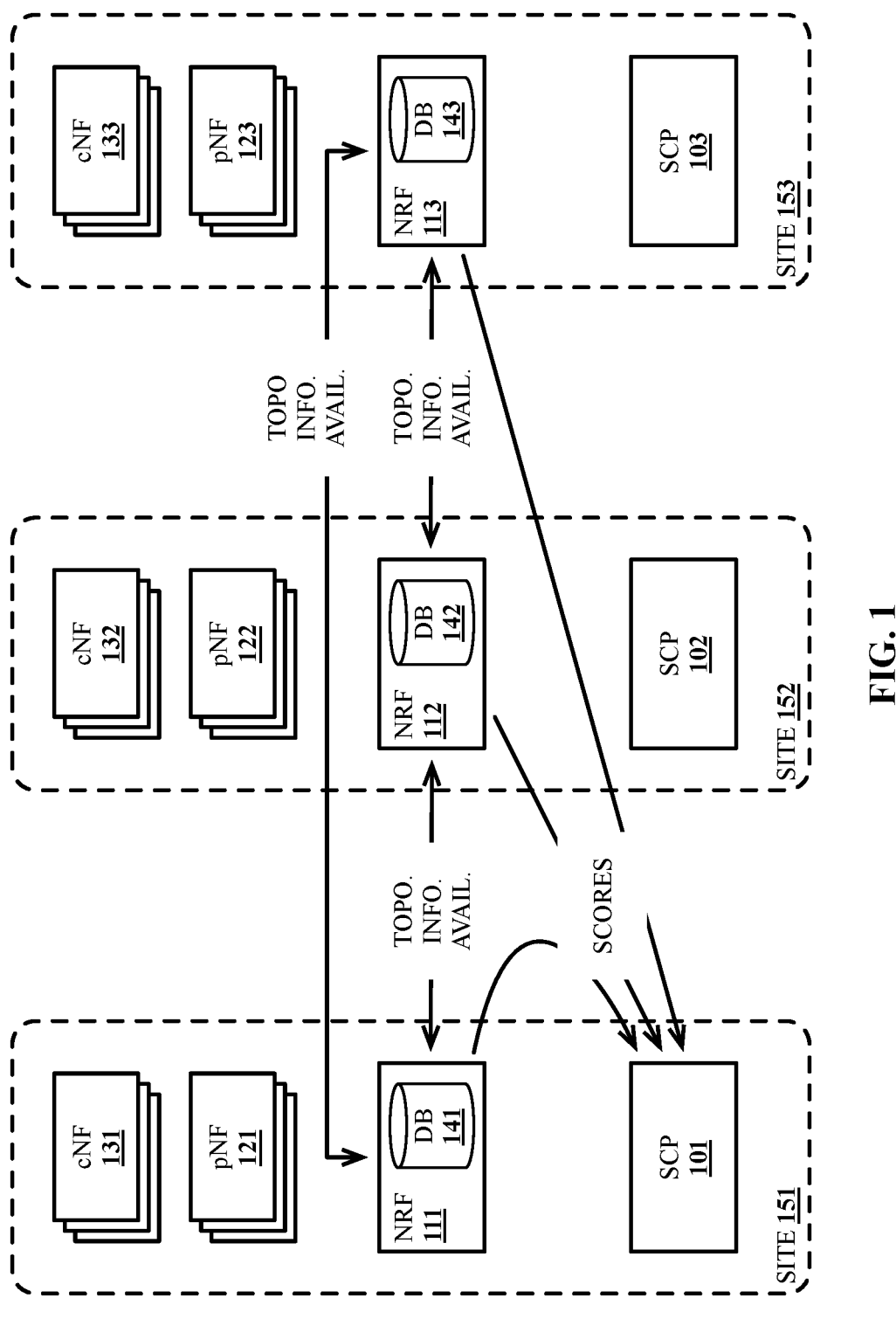
FIG. 1 illustrates an implementation for providing resiliency against NRF failure in a 5G network.

FIG. 1 illustrates implementation 100 for providing resiliency against NRF failure in a 5G network. Implementation 100 includes SCPs 101-103, NRFs 111-113, producer NFs (pNFs) 121-123, and consumer NFs (cNFs) 131-133, which are part of a 5G network. Network sites 151-153 are different physical locations that include 5G network components. Different sites may be used to ensure redundancy of NFs, to lower network latency, ensure adequate network capacity, or used for some other reason—including combinations thereof. pNF 121 is one of multiple pNFs at network site 151 and cNF 131 is one of multiple cNFs at network site 151. pNF 122 is one of multiple pNFs at network site 152 and cNF 132 is one of multiple cNFs at network site 152. pNF 123 is one of multiple pNFs at network site 153 and cNF 133 is one of multiple cNFs at network site 153.

cNFs 131-133 are responsible for providing specific services to end users while pNFs 121-123 are responsible for providing data and services to cNFs 131-133. cNFs 131-133 may include a Policy Control Function (PCF), Application Function (AF), Network Slice Function (NSFF), User Equipment (UE) Lifecycle Management Function (ULM), Charging Function (CHF), Traffic Management Function (TMF), Downlink (DL) and Uplink (UL) Packet Processing Functions (PPFs), or any other type of cNF that may be employed by a 5G wireless network. pNFs 121-123 may include a Session Management Function (SMF), Access and Mobility Management Function (AMF), Authentication Function (AUTH), Unified Data Management Function (UDM), Policy Function (PF), Network Repository Function (NRF), Network Slice Management Function (NSMF), or any other type of pNF that may be employed by a 5G wireless network.

SCPs 101-103 act as central hubs for handling and routing signaling messages exchanged between pNFs 121-123 and cNFs 131-133. An SCP simplifies the network topology of the 5G network by eliminating direct connections between NFs, reducing the complexity of 5G SBI message routing. SCP 101 may perform load balancing and overload handling to distribute the load of 5G SBI messages across multiple NFs, preventing any single NF from becoming overloaded. SCP 101 may also standardize the formats and parameters of 5G SBI messages, ensuring compatibility between different NFs (e.g., NFs from different vendors). NRFs 111-113 are part of an NRF set that tracks available NFs and their capabilities in their respective databases 141-143. Under normal operation, an NRF constantly receives updates about NFs joining or leaving the network, their performance, and the services they offer. When other network components need to find and communicate with specific NFs, they consult the NRF for the most accurate and up-to-date information. This ensures smooth communication and efficient service delivery throughout the 5G network. Issues arise when an NRF fails to provide accurate 5G NF topology information.

Figure 2:
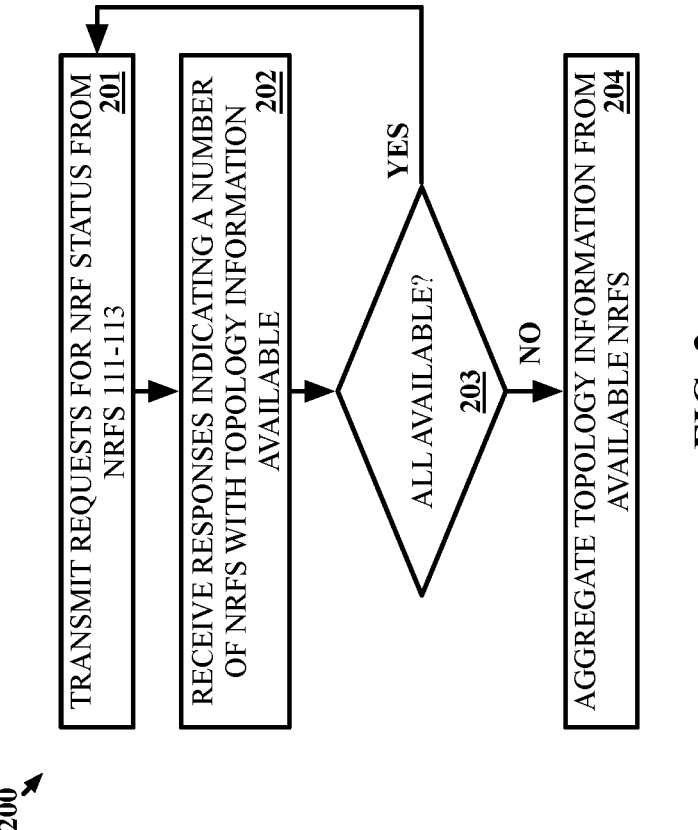
FIG. 2 illustrates an operation to provide resiliency against NRF failure in a 5G network.

FIG. 2 illustrates operation 200 to provide resiliency against NRF failure in a 5G network. Operation 200 and the scenarios below are described from the perspective of SCP 101, but SCP 102 and SCP 103 may perform similar actions. In operation 200, SCP 101 transmits requests for NRF status from a to NRFs 111-113 (step 201). The NRF status includes information about which of NRFs 111-113 are operative and able to provide 5G NF topology information. SCP 101 receives responses to the requests from NRFs 111-113 or at least from those NRFs that are operative (step 202). The requests and responses may be exchanged using an NRF bootstrapping service, which may be enabled by an application programming interface (API) on NRFs 111-113. The NRF bootstrapping service lets NF service consumers of the NRF know about the services endpoints it supports, the NRF Instance ID, and NRF Set ID if the NRF is part of an NRF set like in this example, by using a version-independent Uniform Resource Identifier (URI) endpoint that does not need to be discovered by using a discovery service. The URI may be "{nrfApiRoot}/bootstrapping" where "{nrfApiRoot}" represents the concatenation of the scheme and authority components of the NRF. "Scheme" refers to the protocol used to access a resource and "authority" refers to the specific server or domain name hosting a resource. SCP 101 may use the URI to transmit a GET/bootstrapping ( ) message to each NRF. The receiving NRF may respond with a 200 OK (Bootstrappinginfo) message including the requested information, a 400 Bad Request (ProblemDetails) message indicating a problem that may have occurred, or a 3xx message indicating that a redirection is required. The response information may indicate whether the NRF is operative or inoperative, or SCP 101 may presume the transmitting NRF is operative. Other conventions may be used to transmit and respond to SCP 101's requests beside the bootstrapping example described above.

A response from an NRF includes an indication of a number of NRFs 111-113 having 5G NF topology information available. The indication may be transmitted in a vendor specific information element (IE). The indication may be a score. In this example, the score may indicate 1/3, 2/3, or 3/3, which indicates the number of NRFs available out of the three NRFs in the set. NRFs 111-113 communicate with each other to each determine a score that is sent to SCP 101. Since an NRF may not necessarily know that its 5G NF topology information is degraded with respect to the actual topology of the network, the score determined by each NRF may differ. Each NRF determines the score by checking whether the 5G NF topology information it is providing is consistent with that of the other two. If the 5G NF topology information is the same, the NRF will generate a score of 3/3. If one of the other two is not the same, then the NRF will generate a score of 2/3 and if both of the other two are not the same then the NRF will generate a score of 1/3. In the latter example, if the other NRFs generated a score of 2/3, then the NRF with the 1/3 score is the NRF with the inconsistent 5G NF topology information (although, SCP 101 will not know which 5G NF topology information is correct).

If all NRFs 111-113 respond to SCP 101 with a score of 3/3 (step 203), then SCP 101 may wait a predefined period before returning to step 201 to transmit the requests again. If one or more of the responses indicates that less than all of NRFs 111-113 have consistent 5G NF topology information available, SCP 101 initiates an NRF failure mitigation process by learning and aggregating 5G NF topology information from all instances in the NRF set (step 204). For example, if database 141 fails (or has not been updated) in NRF 111, then NRF 111 cannot provide updated 5G NF topology information. Aggregating 5G NF topology information from NRF 111 with that from NRF 112 and NRF 113, which may have updated databases 142-143, enables SCP 101 to ensure it has updated 5G NF topology information for routing. Had SCP 101 only communicated with NRF 111, SCP 101 would not have known the 5G NF topology information provided by NRF 111 is degraded, which could cause routing issues in the 5G network. In some examples, if the primary NRF (e.g., NRF 111) is degraded (i.e., reporting 1/3) while the other two NRFs are fine (i.e., reporting 2/3), SCP 101 may switch to communicating with NRF 112 or NRF 113 for 5G NF topology information. If all NRFs 111-113 provide a score of 0, the entire NRF set has failed, and SCP 101 may continue routing based on previously acquired 5G NF topology information.

Figure 3:
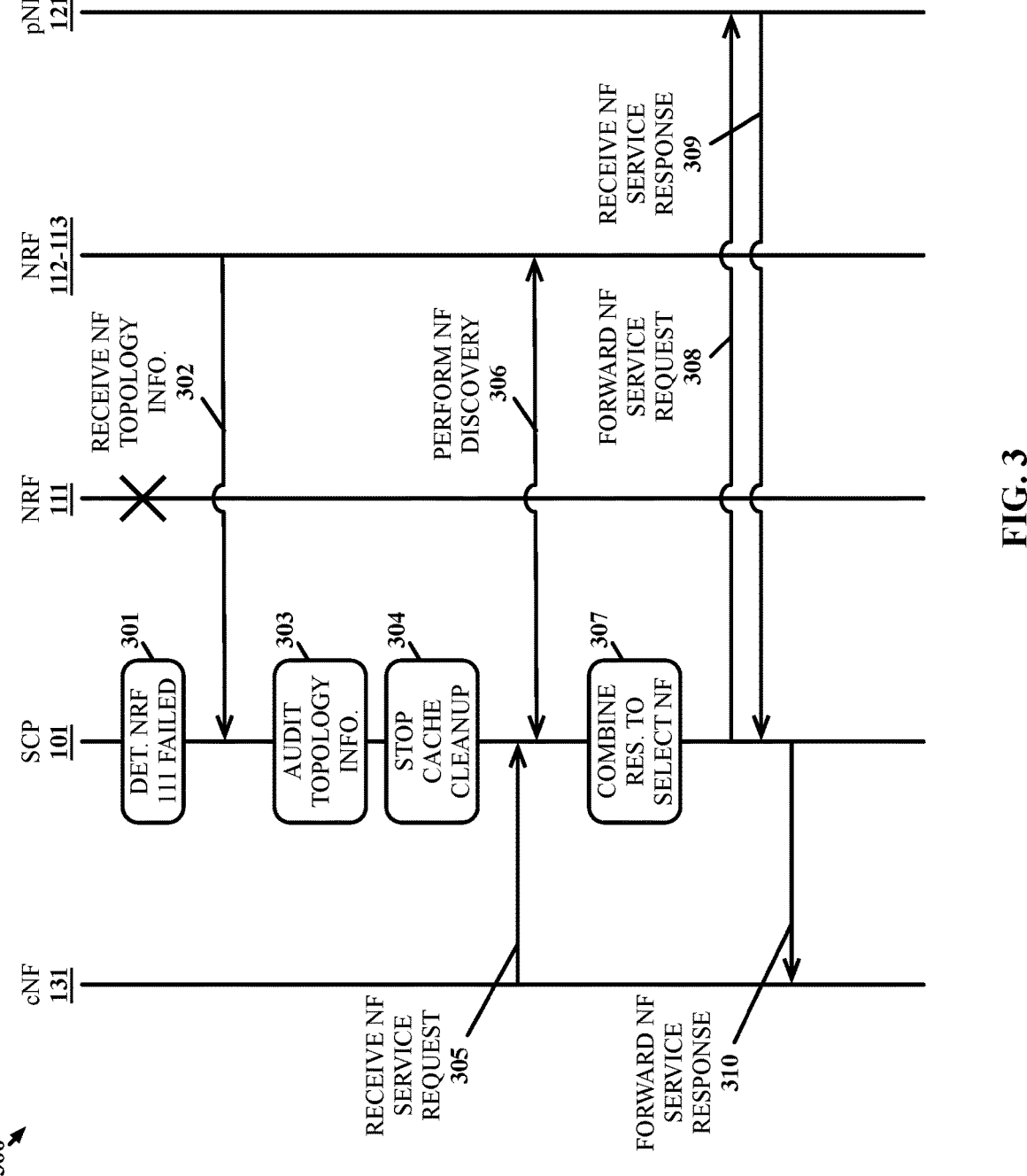
FIG. 3 illustrates an operational scenario for providing resiliency against NRF failure in a 5G network.

FIG. 3 illustrates operational scenario 300 for providing resiliency against NRF failure in a 5G network. In operational scenario 300, SCP 101 is enhanced to initiate the mitigation plan mentioned above in situation where one or more of NRFs 111-113 is in degraded state with limited 5G NF topology information. In this example, SCP 101 determines at step 301 that NRF 111 has failed (i.e., is providing degraded 5G NF topology information in this case). SCP 101 receives 5G NF topology information from NRF 112 and NRF 113 at step 302 to start learning the 5G NF topology of the 5G network. In some examples, SCP 101 may still receive 5G NF topology information from NRF 111 even though the information is degraded. The 5G NF topology information may be requested by SCP 101 or the NRFs may be configured to send the information automatically. SCP 101 aggregates the 5G NF topology data from all NRF instances of NRF-set so the aggregated 5G NF topology can be used for routing of 5G SBI requests at SCP to continue the routing as expected in the network.

SCP 101 audits and aggregates 5G NF topology information at step 303 so SCP 101 can continue the routing of indirect communications without delegating discovery service requests (i.e., Model C Initial service request and subsequent service request routing). For context, when the 5G network is operating using Model C, a cNF directly queries an NRF to discover target pNFs. The cNF then uses the SCP to route signaling messages to the discovered pNFs. When the 5G network is operating using Model D, the SCP is responsible for discovering and selecting the appropriate pNFs based on policies and load balancing. A cNF sends signaling messages to the SCP, which then routes them to the selected pNFs. Thus, in both models, SCP 101 needs updated routing information to route messages between cNFs 131-133 and pNFs 121-123. The routing information is updated using the aggregated 5G NF topology information. During the audit, NF Deregister and NF SUSPENDED state notifications received from an NRF are validated from other available NRFs of NRF-set until NRF 111 recovers. The validation is necessary because SCP 101 does not want to inadvertently limit the NFs accessible in the 5G network due to outdated 5G NF topology information.

SCP 101 further stops the discovery response cache record cleanup at step 304. The cache cleanup is typically based on a validity period received in a discovery response to a previous delegated discovery request in Model D operation. Discovery responses are cached so that SCP 101 can respond to similar subsequent requests without querying an NRF. When NRFs are providing degraded 5G NF topology information, keeping cached responses longer than their validity period enables SCP 101 to continue responding using a cached response. Model C implementations may not include a cache and step 304 may, therefore, be unnecessary.

SCP 101 receives a new NF service request at step 305 from cNF 131. In this case, a response is not cached. Therefore, SCP 101 performs NF discovery at step 306 by querying NRF 112 and NRF 113. The received responses during step 306 are combined by SCP 101 to determine a response to the service request. SCP 101 may operate under a set of rules or policies that indicate how to select an NF. In this example, pNF 121 is selected and SCP 101 routes the service request message at step 308 to pNF 121. A response to the service request message is transmitted from pNF 121 at step 309 and SCP 101 forwards the response to cNF 131 at step 310. pNF 121 and cNF 131 are, therefore, able to communicate even though NRF 111 has failed to provide accurate 5G NF topology information. In other examples, if SCP 101 is using Model C, SCP 101 may identify pNF 121 to cNF 131 and allow cNF 131 to contact pNF 121 directly.

When NRF 111 recovers and is now providing the same 5G NF topology information as NRF 112 and NRF 113, SCP 101 audits its 5G NF topology information using 5G NF topology information from NRF 111 so that SCP 101 can obtain the most up to date 5G NF topology information. SCP 101 may then stop auditing with NRF 112 and NRF 113 as well since they have the same 5G NF topology information. SCP 101 may also start processing the NF status (SUSPENDED/Deregister) notifications from NRF 111 without validation. Thus, SCP 101 returns to normal operation.

Figure 4:
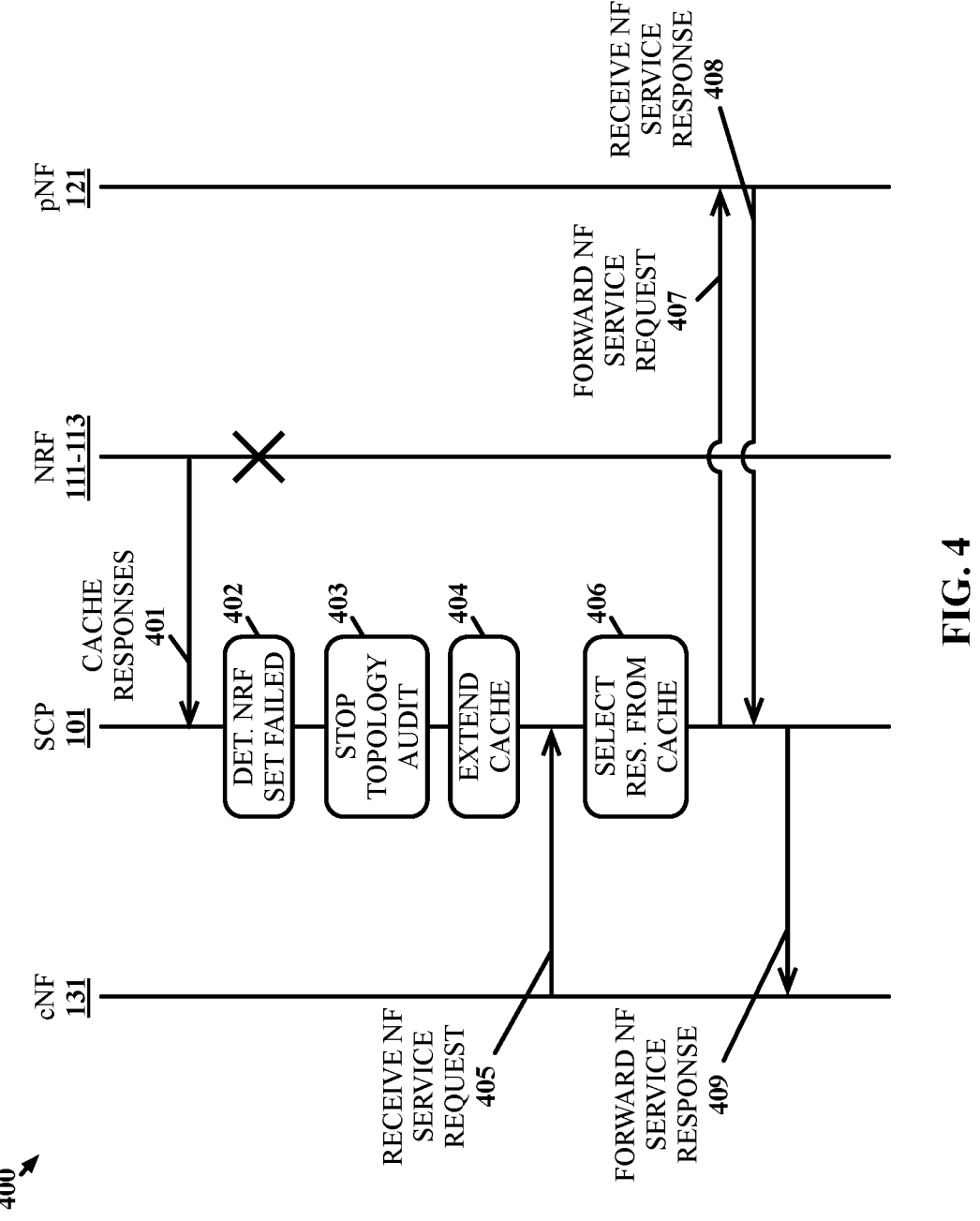
FIG. 4 illustrates an operational scenario for providing resiliency against NRF failure in a 5G network.

FIG. 4 illustrates operational scenario 400 for providing resiliency against NRF failure in a 5G network. In operational scenario 400, SCP 101 extends the validity of its NF discovery response cache to continue routing based on the cached responses in the event the NRF set fails (i.e., NRFs 111-113 all fail). During normal operation with NRFs 111-

113 providing up to date 5G NF topology information, SCP 101 caches NF discovery responses at step 401 from NRFs 111-113 (or just a primary one of NRFs 111-113). SCP 101 determines the NRF set failed at step 402. The determination may be made based on SCP 101 receiving 0 scores from all of NRFs 111-113 or not receiving responses from NRFs 111-113.

In response to detecting the set failure, SCP 101 stops auditing its 5G NF topology information with NRFs 111-113 at step 403. This enables SCP 101 to continue the routing of Model C Initial service requests and subsequent service request routing based on its current 5G NF topology information. SCP 101 further ignores NF status notifications from NRFs 111-113 until NRFs 111-113 recover since there is no way for SCP 101 to audit those notifications. In some examples, SCP 101 may have a configurable "NRF-NF-Profiles-Down" timer for which audit functionality can be on hold. SCP 101 also extends the validity period at step 401 for the discovery responses that were cached at step 404. Since NRFs 111-113 are down, new delegated discovery requests received by SCP 101 will have to be served based on the cached responses rather than queries to NRFs 111-113. As such, SCP 101 extends the validity period of the cached responses to prevent cached responses from becoming invalid when they could still be useful in servicing delegated discovery requests. As such, when SCP 101 receives a NF service request at step 405 from cNF 131, SCP 101 selects pNF 121 from a cached discovery response at step 406. The service request is forwarded at step 407 to pNF 121, which responds to SCP 101 at step 408. SCP 101 forwards the response from pNF 121 at step 409 to cNF 131.

In response to at least one of NRFs 111-113 recovering (or the "NRF-NF-Profiles-Down" timer" expired if so configured), SCP 101 restarts the audit with NRFs 111-113 to ensure SCP 101 has the most up to date 5G NF topology information. SCP 101 continues the routing of Model C Initial service requests and subsequent service request routing. In examples where the "NRF-NF-Profiles-Down" timer expires to trigger the audit, SCP 101 assumes the timer duration is long enough such that, if the timer expires, then the cached data at SCP 101 is old enough that more harm may come to the 5G network by continuing to use the cached responses rather than would come by flushing the cached data (i.e., syncing the 5G NF topology information during the audit). SCP 101 may also restart processing NF status notifications from NRFs 111-113, may start sending NF discovery requests to NRF, and may start cleaning the cached discovery responses.

Figure 5:
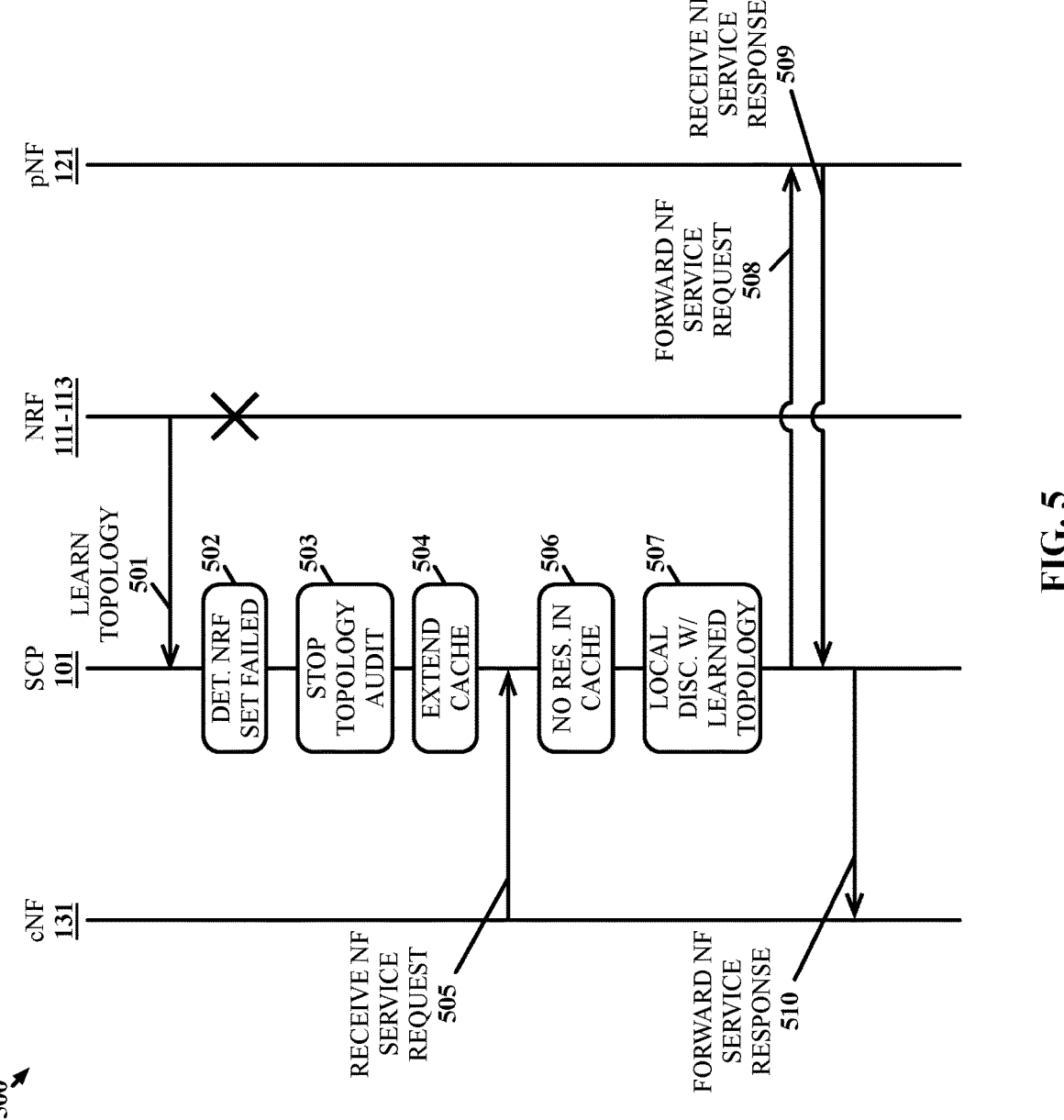
FIG. 5 illustrates an operational scenario for providing resiliency against NRF failure in a 5G network.

FIG. 5 illustrates operational scenario 500 for providing resiliency against NRF failure in a 5G network. Operational scenario 500 covers what may happen when SCP 101 continues to use its learned 5G NF topology information and cached discovery responses during failure of the NRF set. There may be routing failures for new delegated discovery service requests for which SCP 101 does not have cached discovery responses. Operational scenario 500 begins with SCP 101 learning the 5G NF topology information at step 501 prior to NRFs 111-113 failing. In response to SCP 101 determining that NRFs 111-113 failed, SCP 101 attempts to mitigate the failure's impact on Model D delegated discovery service request routing. The mitigation includes SCP 101 enabling NF discovery for received delegated discovery service requests to be performed based on its own learned 5G NF topology information rather than querying NRFs 111-113. Local delegated discovery can cover static NF topology configured at SCP 101 and learned from NRFs 111-113. This may help SCP 101 to continue routing based on static topology configuration.

In the context of operational scenario 500, SCP 101 first performs similarly to what occurred in operational scenario 400. Specifically, when SCP 101 determines NRFs 111-113 failed at step 502, SCP 101 stops the audit of its 5G NF topology information at step 503. SCP 101 also extends the validity period for cached discovery responses at step 504. SCP 101 receives a new NF service request at step 505 from cNF 131. If a relevant response is in the cache, SCP 101 would use the response to route the service request. However, in this example, SCP 101 determines at step 506 that the cache does not include a response that will work with the service request. In response to that determination, SCP 101 selects pNF 121 at step 507 by discovering pNF 121 using the 5G NF topology information SCP 101 learned in step 501. The service request is forwarded at step 508 to pNF 121, which responds to SCP 101 at step 509. SCP 101 forwards the response from pNF 121 at step 510 to cNF 131. Advantageously, SCP 101 can handle a service request while NRFs 111-113 are down even when a previous response cannot be found in the cache.

Figure 6:
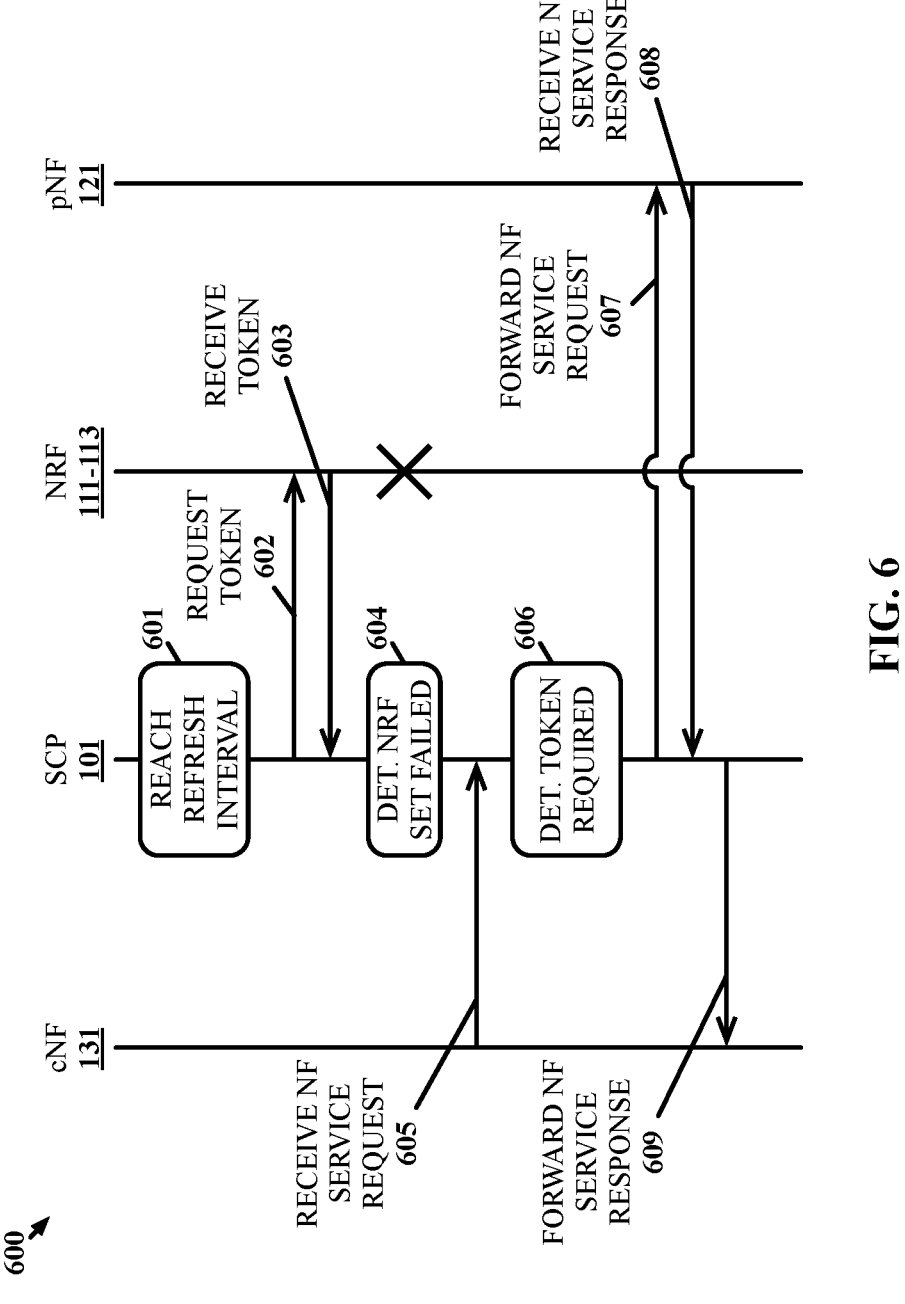
FIG. 6 illustrates an operational scenario for providing resiliency against NRF failure in a 5G network.

FIG. 6 illustrates operational scenario 600 for providing resiliency against NRF failure in a 5G network. In some examples, the 5G network may use access tokens provided by NRFs 111-113. For example, NRFs 111-113 may use OAuth2 authorization to provide access tokens. Access tokens often include an expiration time. If an access token expires when NRFs 111-113 have failed, SCP 101 has no way to retrieve an updated access token from NRFs 111-113. Thus, even if SCP 101 can use cached responses or local discovery per the above scenarios, cNF 131 will not be able to access pNF 121 without the updated access token pNF 121 expects. Operational scenario 600 is an example for how SCP 101 may handle access tokens to ensure communications can still occur between NFs even when NRFs 111-113 cannot provide updated access tokens.

In operational scenario 600, NRFs 111-113 are configured to provide an access token with an extended expiration time. The extended expiration time is equal to a defined refresh interval (as would typically apply to access tokens) plus an expected recovery time for NRFs 111-113. The expected recovery time may be manually set by a user or may be determined automatically based on historical NRF recovery times. SCP 101 determines the refresh interval for the access token is reached at step 601. Since the extended expiration time also includes the expected recovery time, the access token does not expire when the refresh interval is reached. Regardless, SCP 101 requests a new access token from NRFs 111-113 at step 602 upon reaching the refresh interval time. NRFs 111-113 are currently operating as normal and, therefore, provide a new access token to SCP 101 at step 603. The expiration time of the new access token is again the refresh interval plus the expected recovery time. SCP 101 also begins counting down until the next refresh interval is reached.

At some time before the next refresh interval is reached, SCP 101 determines at step 604 that the NRF set having NRFs 111-113 has failed. SCP 101 now knows that, even if the refresh interval expires, SCP 101 will not be able to retrieve a new access token from NRFs 111-113. Fortunately, the access token supplied by NRFs 111-113 in step 603 will still be valid beyond the refresh interval by an amount of time equal to the expected recovery time of NRFs 111-113. When SCP 101 receives a service request from cNF 131 at step 605 and determines at step 606 an access token is required to access the selected pNF 121, SCP 101 can still use the access token received in step 603. The service request is forwarded with the access token at step 607 to pNF 121, which responds to SCP 101 at step 608. SCP 101 forwards the response from pNF 121 at step 609 to cNF 131.

FIG. 7 illustrates a computing system 700 that is representative of any system or collection of systems in which the various processes, systems, programs, services, and scenarios disclosed herein may be implemented. Examples of computing system 700 include, but are not limited to, desktop computers, laptop computers, server computers, routers, web servers, cloud computing platforms, and data center equipment, distributed computing systems, as well as any other type of physical or virtual server machine, physical or virtual router, container, and any variation or combination thereof. It should be understood virtualized components are executing on physical hardware like that of computing system 700.

Computing system 700 may be implemented as a single apparatus, system, or device or may be implemented in a distributed manner as multiple apparatuses, systems, or devices. Computing system 700 may include, but is not limited to, processing system 715, storage system 705, software 725, communication interface system 710, and user interface system 720. Processing system 715 may be operatively coupled with storage system 705, communication interface system 710, and user interface system 720.

Processing system 715 may load and execute software 725 from storage system 705. Software 725 may include and implement network function process 730, which may be representative of any of the operations for providing resiliency against NRF failure in a 5G network (e.g., operation 200 and operational scenarios 300-600). Accordingly, computing system 700 may be one of SCPs 101-103, NRFs 111-113, or may be a host system for a virtualized example of those components. Computing system 700 may also represent computing systems for pNFs 121-123 and cNFs 131-133—including combinations thereof. When executed by processing system 715, software 725 may direct processing system 715 to operate as described herein for at least the various processes, operational scenarios, and sequences discussed in the foregoing implementations. Computing system 700 may optionally include additional devices, features, or functionality not discussed for purposes of brevity.

In some embodiments, processing system 715 may comprise a micro-processor and other circuitry that retrieves and executes software 725 from storage system 705. Processing system 715 may be implemented within a single processing device but may also be distributed across multiple processing devices or sub-systems that cooperate in executing program instructions. Examples of processing system 715 may include general purpose central processing units, graphical processing units, application specific processors, and logic devices, as well as any other type of processing device, combinations, or variations thereof.

Storage system 705 may comprise any memory device or computer readable storage media readable by processing system 715 and capable of storing software 725. Storage system 705 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a transitory form of signal transmission (often referred to as "signals per se"), such as a propagating electrical or electromagnetic signal or carrier wave.

In addition to computer readable storage media, in some implementations storage system 705 may also include computer readable communication media over which at least some of software 725 may be communicated internally or externally. Storage system 705 may be implemented as a single storage device but may also be implemented across multiple storage devices or sub-systems co-located or distributed relative to each other. Storage system 705 may comprise additional elements, such as a controller, capable of communicating with processing system 715 or possibly other systems.

Software 725 (including network function process 730 among other functions) may be implemented in program instructions that, when executed by processing system 715, direct processing system 715 to operate as described with respect to the various operational scenarios, sequences, and processes illustrated herein. For example, network function process 730 may include program instructions for a SCP to transmit requests for NRF status from a Service Communications Proxy (SCP) to NRFs in a 5G network, wherein the NRFs exchange messages with each other to determine whether Network Function (NF) topology information is available from the NRFs, receive responses to the requests in the SCP, wherein the responses indicate a number of the NRFs from which the NF topology information is available, determine that a failed NRF of the NRFs is in a failed state based on the responses, and aggregate the NF topology information in the SCP from operative NRFs other than the failed NRF. Also, network function process 730 may include program instructions for an NRF to exchange Network Function (NF) topology information between NRFs in an NRF set, in response to requests for NRF status from a Service Communications Proxy (SCP) of the 5G network, transmitting the NF topology information to the SCP from the NRF set, determine at least one of the NRFs is not sending the NF topology information correctly, and, in response to subsequent requests for the NRF status from the SCP, transmit NF topology information to the SCP from the NRF set In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 725 may include additional processes, programs, or components, such as operating system software, virtualization software, or other application software. Software 725 may also comprise firmware or some other form of machine-readable processing instructions executable by processing system 715.

In general, software 725 may, when loaded into processing system 715 and executed, transform a suitable apparatus, system, or device (of which computing system 700 is representative) overall from a general-purpose computing system into a special-purpose computing system customized to act, for example, as a slice breather or the like as described herein. Indeed, encoding software 725 on storage system

705 may transform the physical structure of storage system 705. The specific transformation of the physical structure may depend on various factors in different implementations of this description. Examples of such factors may include, but are not limited to, the technology used to implement the storage media of storage system 705 and whether the computer-storage media are characterized as primary or secondary storage, as well as other factors.

For example, if the computer readable storage media are implemented as semiconductor-based memory, software 725 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 710 may include communication connections and devices that allow for communication with other computing systems (not shown) over communication networks (not shown). Examples of communication connections and devices that together allow for inter-system communication may include network interface cards, antennas, power amplifiers, radio-frequency (RF) circuitry, transceivers, and other communication circuitry. The communication connections and devices may communicate over communication media to exchange communications with other computing systems or networks of systems, such as metal, glass, air, or any other suitable communication media.

Communication between computing system 700 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof.

As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the only system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method for identifying Network Function Repository Function (NRF) failure in a 5G network, the method comprising:

transmitting requests for NRF status from a Service Communications Proxy (SCP) to NRFs in a 5G network, wherein the NRFs exchange messages with each other to determine whether Network Function (NF) topology information is available from the NRFs;

receiving responses to the requests in the SCP, wherein the responses indicate a number of the NRFs from which the NF topology information is available; and identifying one or more failed NRFs of the NRFs that are in a failed state based on the responses, wherein the NF topology information is aggregated from operative NRFs should one or more of the NRFs still be operative.

2. The method of claim 1, wherein the responses comprise responses from a bootstrapping service of the NRFs that further indicate whether the NRFs are operative or non-operative.

3. The method of claim 1, comprising:

updating routing information in the SCP for Service Based Interface (SBI) requests from aggregated NF topology information.

4. The method of claim 3, comprising:

routing a NF service request received by the SCP based on the routing information after the routing information is updated.

5. The method of claim 1, comprising:

while the one or more failed NRFs are in the failed state:

validating NF deregister and NF suspended notifications from the failed NRF with the operative NRFs; and using cached discovery responses to select an NF in response to a delegated discovery request.

6. The method of claim 1, comprising:

upon no operative NRFs being available after identifying the one or more failed NRFs:

stopping a cache record cleanup of discovery responses; and routing delegated discovery requests based on the discovery responses in the cache.

7. The method of claim 6, comprising:

when a discovery response to a delegated discovery request is not in the cache, routing a discovery request based on the NF topology information.

8. The method of claim 6, comprising:

upon recovery of the one or more failed NRFs, restarting the cache record cleanup.

9. The method of claim 1, comprising:

renewing a NF access token from the NRFs in the SCP while the access token still has an amount of a lifetime remaining greater than an expected recovery time for the NRFs;

caching the NF access token from the NRFs in the SCP; and using the NF access token for a service request.

10. The method of claim 1, comprising:

when the one or more failed NRFs recover, auditing the NF topology information in the SCP to update the NF topology information.

11. An apparatus for a Service Communications Proxy (SCP) in a 5G network to identify Network Function Repository Function (NRF) failure in a 5G network, the apparatus comprising:

one or more computer readable storage media;

a processing system operatively coupled with the one or more computer readable storage media; and program instructions stored on the one or more computer readable storage media that, when read and executed by the processing system, direct the apparatus to:

transmit requests for NRF status from to NRFs in a 5G network, wherein the NRFs exchange messages with each other to determine whether Network Function (NF) topology information is available from the NRFs;

receive responses to the requests, wherein the responses indicate a number of the NRFs from which the NF topology information is available; and identify one or more failed NRFs of the NRFs that are in a failed state based on the responses, wherein the NF topology information is aggregated from operative NRFs should one or more of the NRFs still be operative.

12. The apparatus of claim 11, wherein the responses comprise responses from a bootstrapping service of the NRFs that further indicate whether the NRFs are operative or non-operative.

13. The apparatus of claim 11, wherein the program instructions direct the processing system to:

update routing information in the SCP for Service Based Interface (SBI) requests from aggregated NF topology information.

14. The apparatus of claim 13, wherein the program instructions direct the processing system to:

route a NF service request received by the SCP based on the routing information after the routing information is updated.

15. The apparatus of claim 11, wherein the program instructions direct the processing system to:

while the failed NRF is in a failed state:

validate NF deregister and NF suspended notifications from the failed NRF with the operative NRFs; and use cached discovery responses to select an NF in response to a delegated discovery request.

16. The apparatus of claim 11, wherein the program instructions direct the processing system to:

upon no operative NRFs being available after identifying the one or more failed NRFs:

stop a cache record cleanup of discovery responses; and route delegated discovery requests based on the discovery responses in the cache.

17. The apparatus of claim 16, wherein the program instructions direct the processing system to:

when a discovery response to a delegated discovery request is not in the cache, routing a discovery request based on the NF topology information.

18. The apparatus of claim 16, wherein the program instructions direct the processing system to:

upon recovery of the one or more failed NRFs, restart the cache record cleanup.

19. The apparatus of claim 11, wherein the program instructions direct the processing system to:

renew a NF access token from the NRFs in the SCP while the access token still has an amount of a lifetime remaining greater than an expected recovery time for the NRFs;

cache the NF access token from the NRFs in the SCP; and use the NF access token for a service request.

20. A method for identifying Network Function Repository Function (NRF) failure in a 5G network, the method comprising:

exchanging Network Function (NF) topology information between NRFs in an NRF set;

in response to requests for NRF status from a Service Communications Proxy (SCP) of the 5G network, transmitting the NF topology information to the SCP from the NRF set;

determining at least one of the NRFs is not sending the NF topology information correctly; and in response to subsequent requests for the NRF status from the SCP, transmitting NF topology information to the SCP from the NRF set.

* * * * *